United States Patent [19]
Tabei et al.

[11] Patent Number: 4,701,798
[45] Date of Patent: Oct. 20, 1987

[54] ELECTRONIC STILL CAMERA SYSTEM WITH DIFFERENTIAL ERROR-CORRECTING MEANS

[75] Inventors: Masatoshi Tabei; Kazuhiro Kawajiri, both of Kanagawa, Japan

[73] Assignee: Fuji Photo Film Co., Ltd., Kanagawa, Japan

[21] Appl. No.: 873,887

[22] Filed: Jun. 13, 1986

[30] Foreign Application Priority Data

Jun. 14, 1985 [JP] Japan .................................. 60-128290
Aug. 16, 1985 [JP] Japan .................................. 60-179305
Sep. 5, 1985 [JP] Japan .................................. 60-194746
Sep. 10, 1985 [JP] Japan .................................. 60-198603

[51] Int. Cl.[4] ............................................. H04N 3/14
[52] U.S. Cl. .......................... 358/213.26; 358/213.25; 358/909
[58] Field of Search ........................ 358/909, 213, 212

[56] References Cited

U.S. PATENT DOCUMENTS 4,263,623 4/1981 Woo et al. ........................... 358/909
4,499,496 2/1985 Tanaka et al. ....................... 358/909
4,541,016 9/1985 Ochi et al. ........................... 358/909
4,556,912 12/1985 Yamanaka et al. ................. 358/213
4,597,014 6/1986 Suzuki ................................. 358/213
4,599,657 7/1986 Kinoshita et al. ................... 358/213
4,603,354 7/1986 Hashimoto et al. ................ 358/909

FOREIGN PATENT DOCUMENTS 104407 8/1983 European Pat. Off. .
21252508 8/1983 United Kingdom .

Primary Examiner—Gene Z. Rubinson
Assistant Examiner—Stephen Brinich
Attorney, Agent, or Firm—Sughrue, Mion, Zinn, Macpeak and Seas

[57] ABSTRACT

An electronic still camera wherein midway through an exposure the charge signals impressed by incident light on an imaging section are transferred to a storage array while the exposure continues. Corresponding signals on the imaging array and the storage arrays are differenced to form error signals which are added to or subtracted from the two original signals before they are combined.

15 Claims, 12 Drawing Figures

ELECTRONIC STILL CAMERA SYSTEM WITH DIFFERENTIAL ERROR-CORRECTING MEANS

BACKGROUND OF THE INVENTION

1. Field of the Invention

This invention relates to an electronic still camera system using a frame transfer type charge-coupled device (CCD), and more particularly to an electronic still camera system in which signal charges for two fields per one picture frame can be read out of a frame transfer type charge-coupled device (CCD).

2. Description of the Background Art

A television camera with a frame transfer type charge-coupled device (hereinafter referred to as "an FTCCD", when applicable) is well known in the art. In the FTCCD, charge signals which are formed in correspondence to an image which is formed on a light receiving section thereof, are transferred, in a parallel mode, separately according to fields to a charge storing section. The charge signals are read out of the storing section according to the scanning order. Transferring the charge signals from the light receiving section to the charge storing section for the first field and transferring the signal charge from the light receiving section to the charge storing section for the second field are carried out alternately.

Accordingly, even if, in the case where such an FTCCD is used for a still camera, picture charge signals for one frame have been formed, the charge signals which can be delivered out are only those for one field. Therefore, the vertical resolution is decreased to half of that which is provided when it is used as a television camera. This drawback is serious especially for a still camera because the defects of pictures formed thereby attract attention.

As is well known in the art, there are available various charge-coupled devices having different picture signal transferring techniques, such as an interline transferring type charge-coupled image pickup device and a frame transferring type charge-coupled image pickup device. In the interline transferring type CCD, charges produced according to incident light are read out in an image pickup cell array comprising image pickup cells arranged two-dimensionally. In order to form picture signals according to a raster scanning system, the optical charges which are produced for one horizontal scanning line by the cells in the image pickup cell array are vertically transferred to horizontal transferring CCDs (hereinafter referred to as "HCCDs", when applicable) in a parallel mode. The charges in the HCCDs are transferred horizontally for every picture element, to provide picture signals. That is, it is necessary to perform the above-described vertical and horizontal transferring operations successively for all the horizontal scanning lines.

In the interline transferring type CCD, a picture can be formed with two fields per one picture frame. However, the construction is intricate, and the aperture efficiency is low. Therefore, the device is not suitable for high sensitivity and high picture element density. On the other hand, in the frame transferring type CCD, the light receiving section is integral with the charge transferring section, and therefore the above-described difficulties are eliminated. However, the device is still disadvantageous in that the one-picture two-field picture formation cannot be obtained because the vertical transferring operation is carried out. All conventional charge-coupled image pickup devices include such vertical transferring operation as described above.

On the other hand, in order to positively achieve the vertical transferring operation, each transferring region for one picture element is provided with four electrodes of polycrystalline silicon so that the vertical transferring CCDs (hereinafter referred to as "VCCDs", when applicable) are driven by four clock pulses. Accordingly on the substrate of the image pickup device, the circuit elements for one picture element occupy a relatively large area. Therefore, the density of the image pickup cells and accordingly that of the picture elements is low, and therefore the picture resolution power is degraded.

SUMMARY OF THE INVENTION

Accordingly, an object of this invention is to provide an electronic still camera system using a CCD, which is high in picture quality and resolution power.

The above, and other objects of this invention have been achieved as follows: First, before exposure, a false reading of the CCD is carried out to empty the charges accumulated in the light receiving section and the charge storing section. Then, the exposure is carried out. In the exposure operation, at the central time instant of the exposure period of time provided by the shutter, charge signals for a frame are transferred from the light receiving section to the charge storing section as a first field signal charge within a period of time which is so short that it can be neglected with respect to the exposure period of time. In this connection, it has been found that a satisfactorily short period of time is about 1/100 of the exposure time period, and if it is shorter than that value, the picture is not adversely affected at all. Transferring of the signal charge in the period of time is for the first field, and the exposure is continued, and therefore a signal charge for the second field is provided in the light receiving section. After the exposure has completed, the first field signal charge in the charge storing section is read out according to the scanning order. At the same time, the second field signal charge in the light receiving section is transferred to the charge storing section, and thereafter read out in the same manner as the first field signal charge.

Thus, all the signal charges for one frame are effectively utilized for formation of a picture.

The exposure period of time is in a range of 1/500 to 1 second depending on photographic purposes, preferably in a range of 1/200 to 1/10 second, and more preferably in a range of 1/125 to 1/15 second. In the case where the exposure period of time is, for instance, 1/100 second, the signal charge transferring period of time during exposure can be 1/10000 second. With respect to exposure periods of time of 1/500 to 1 second, the shortest signal charge transferring period of time is 1/50,000 second. This can be achieved readily by current CCD techniques.

DETAILED DESCRIPTION OF THE INVENTION

Figure 1:
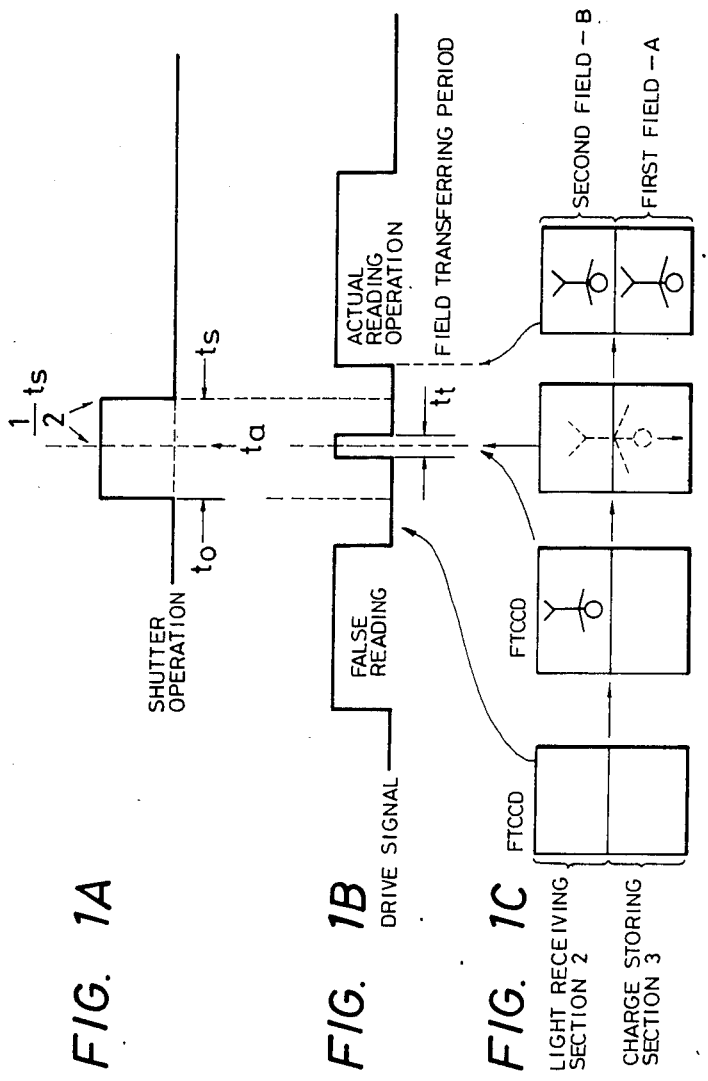
FIG. 1A-1C constitute an explanatory diagram for a description of the operation of a camera which is operated according to an electronic still camera system of the present invention.

The first embodiment of this invention will be described with reference to FIG. 1.

FIGS. 1A-1C are time charts for a description of the operation of the camera which is controlled according to an electronic still camera system of the invention. FIG. 1A indicates the operation of the shutter of the camera. At the time instant $t_0$, the shutter is opened, and when a period of time $t_s$ elapses after the time instant $t_0$ the shutter is closed. FIG. 1B indicates the control timing of a CCD. Before the time instant $t_0$; i.e., immediately after the camera shutter button is operated by the photographer, the false reading of the CCD is carried out. In the operation, all the charges which are left in the light receiving section and the charge storing section of the CCD, as the case may be, are discharged. That is, the CCD is emptied. This reading period of time is generally of the order of 1/30 second, and after the reading period of time an actual exposure is started. However, the reading time period, i.e., 1/30 second, is not so long as the photographer feels it as a delay of exposure. After the false reading is accomplished, the CCD is emptied. This state is indicated by the arrow in correspondence to that time instant.

When the exposure is started at the time instant $t_0$, the light receiving section of the CCD is charged according to the image formed thereon. When a half of the exposure period $t_s$ passes, the charges which are formed in the light receiving section of the CCD come to a substantially desired quantity. This state of the CCD is indicated in correspondence to the time instant. In this operation, no signal charge exists in the charge storing section of the CCD. Thus, the charge storing section of the CCD is shielded from light while the light receiving section of the CCD receives imaged light.

At the time instant $t_a$ immediately after the half of the exposure time $t_s$ has passed, the signal charge which has been formed in the light receiving section is transferred to the charge storing section. During the transfer of the signal charge, the exposure is being carried out. Therefore a new signal charged formed by the exposure is superposed on the former signal charge. However, since the signal transferring time period $t_t$ is sufficiently short, the adverse effect of the signal charge thus superposed on the picture quality can be neglected. During the transfer of the signal charge, the state of the CCD is as illustrated in FIG. 1C.

When the transferring period of time $t_t$ has passed, the light receiving section of the CCD is substantially emptied, and the signal charge is substantially only in the charge storing section of the CCD. Thereafter, the exposure is continued for another time period of $t_s/2$.

Therefore, at the end of the exposure period of time $t_s$, the signal charge in the charge storing section of the CCD corresponds to the first field while the signal charge in the light receiving section of the CCD corresponds to the second field as indicated in FIG. 1C.

Thereafter, the content of the CCD is read out in a conventional method to form a picture signal corresponding to one frame. The picture signal is stored in a memory such as floppy disc as shown in FIG. 2.

Figure 2:
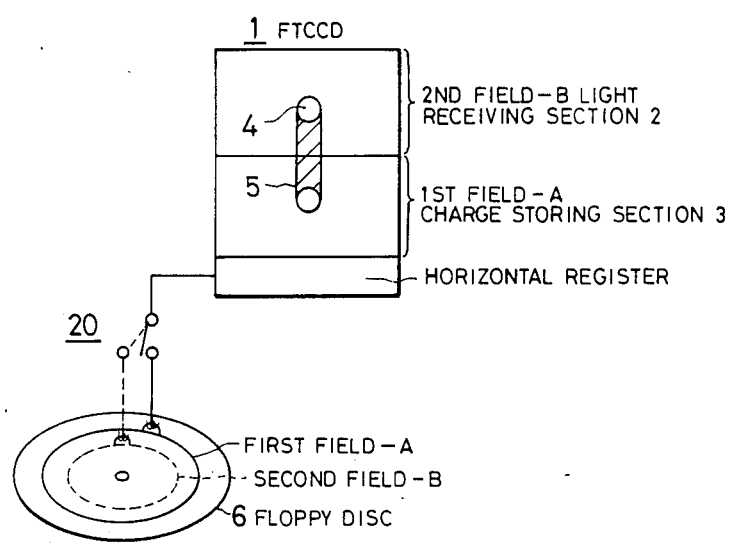
FIG. 2 is an explanatory diagram showing a state of signal charges in a CCD for application of a signal processing operation according to this invention.

FIG. 2 shows the charge signal formed in the CCD 1 being recorded on the floppy disc 6 by a two-channel magnetic recording device 20 in the order of the first field and second field. The signals thus recorded are designated by reference characters A and B on the left in FIG. 5. The difference between the two signals is also indicated on the right in FIG. 5.

While the embodiment of FIG. 1 employs a frame transfer type CCD, a different type CCD may be employed to accomplish the present invention.

One preferred example of such a different type CCD which is employed in the electronic still camera of the present invention will be described with reference to FIG. 3.

Figure 3:
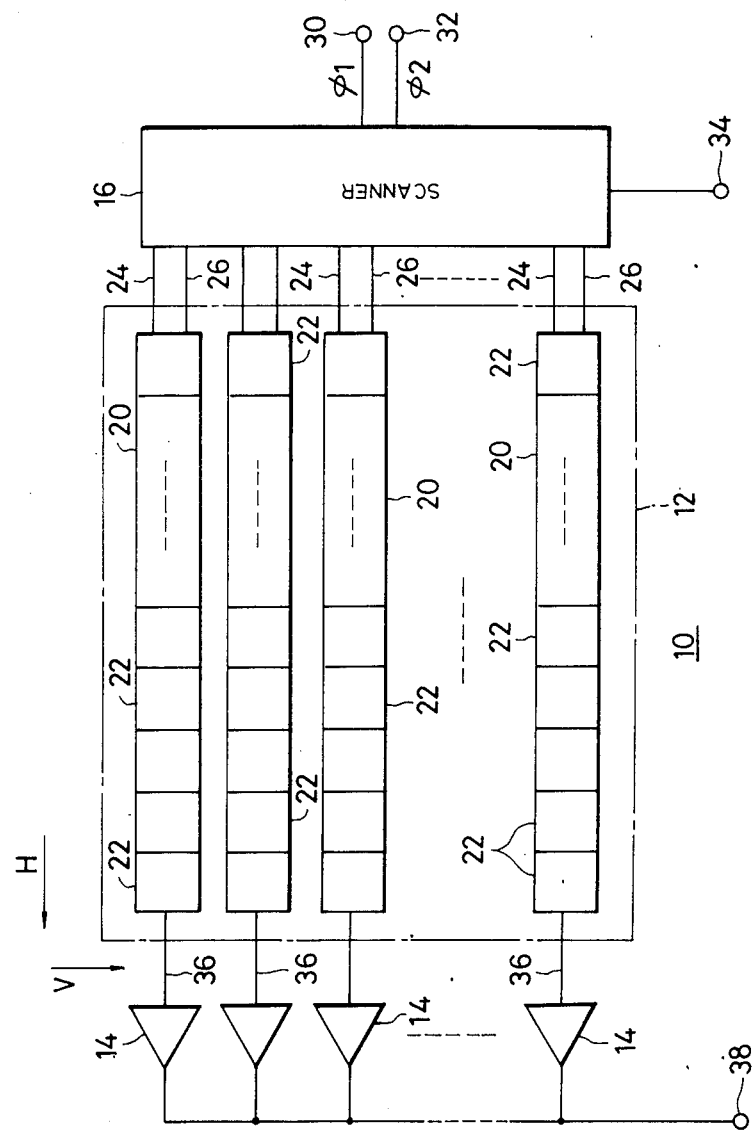
FIG. 3 is a schematic diagram showing a CCD and processing circuits therefor.

As shown in FIG. 3, in the example, circuit elements such as an image pickup cell array 12, floating diffusion (FD) amplifiers 14 and a scanning circuit 16 are provided in the form of a MOS structure on the main surface of a semiconductor substrate 10 of silicon or the like. The image pickup cell array 12 is divided into a light receiving section on the right and a charge storing section on the left.

The image pickup cell array 12 comprises a number of horizontal transfer type CCDs, namely, HCCDs 20 which are extended in a horizontal direction (or in the direction of the arrow H and are arranged in a vertical direction (or in the direction of the arrow V). Each of the horizontal transfer type CCDs 20 has a number of transfer electrodes 22. The transfer electrodes 22 of each of the HCCDs 20 are so arranged that transfer clock pulses $\phi_1$ and $\phi_2$ of two phases alternately drive the transfer electrodes 22. In other words, the electrodes 22 are alternately connected to clock lines 24 and 26 so that different electric fields are formed by insulation layers and diffusion regions below them.

Two adjacent electrodes 22 are provided per picture element. In the above-described charge-coupled image pickup device, the transfer electrodes 22 are made of polycrystalline silicon, and it is thin enough to be semi-transparent to incident light. Therefore, optical charges corresponding to the quantities of incident light are formed in the main surface regions of the substrate 10 under the electrodes 22. Thus, the image pickup cell array 12 provides the image pickup region in which the image pickup cells for the picture elements are arranged two-dimensionally.

The clock lines 24 and 26 of the HCCDs 20 are connected to the scanning circuit 16, which is connected to clock lines 30 and 32. The scanning circuit 16 is the clock pulse distributing means which distributes the clock pulses $\phi_1$ and $\phi_2$ to the clock lines 24 and 26 of the HCCDs 20 selectively and successively. The clock pulses $\phi_1$ and $\phi_2$ are supplied to respective clock lines 30 and 32 from outside. This clock pulse distribution is carried out in synchronization with a stepping clock pulses applied to a drive terminal 34. The clock pulses $\phi_1$ and $\phi_2$ are opposite in phase to each other, and are supplied at a speed equal to a picture signal's picture element frequency. The stepping clock pulse supplied to the terminal 34 is synchronous with the horizontal scanning (1H) frequency in the raster scanning of a picture signal.

Therefore, the scanning circuit 16 distributes the clock pulses φ1 and φ2 to the HCCDs 20 successively in such a manner that it supplies the clock pulses φ1 and φ2 inputted to the terminals 30 and 32 to the terminals 24 and 26 of one HCCD 20 for a period of 1H. For the next period of 1H, the scanning circuit 16 applies the clock pulses φ1 and φ2 to the terminals 24 and 26 of the HCCD 20 which is located next to the former one in the vertical scanning direction V. The process continues through all the HCCDs 20.

When the first frame is transferred from the light receiving section to the charge storing section, only a sufficient number of clock pulses φ0 and φ1 are supplied to serially transfer the signals over half the electrodes 22. A similar number of pulses are supplied to read the charge storing section.

Each HCCD 20 has an output terminal 36 which is connected to the aforementioned floating diffusion amplifier 14. The output terminals of the floating diffusion amplifiers 14 are connected to a picture signal output terminal 38. Each of the floating diffusion amplifiers 14 reads out a voltage corresponding to the optical charge transferred to the output terminal of the HCCD 20 to which it is connected. For this purpose, a diffusion capacitor is formed in the main surface of the substrate 10.

The optical charges formed in the image pickup cells by incident light are read out as picture signals as follow: The scanning circuit 16 applies the clock pulses φ1 and φ2, which are opposite in phase to each other providing a predetermined phase pattern, to the clock terminals 24 and 26 of the HCCDs 20. Under this condition, in correspondence to incident light, optical charges are produced and stored in the potential wells formed by the image pickup cells.

The scanning circuit 16 receives through the clock terminals 30 and 32 the clock pulses φ1 and φ2 which are opposite in phase from each other, and applies them to the terminals 24 and 26 of the uppermost HCCD 20 for the period of 1H. In response to the pulse application, in the HCCD 20, the optical charges of the picture elements are transferred in the horizontal direction H, thus being applied through the output terminal 36 to the amplifier 14 successively beginning with the leftmost optical charge. Thus, the optical charges are successively outputted as the picture signal of the first horizontal scanning line through the output terminal 38.

When the period of 1H has passed, the scanning circuit 16 receives one clock pulse through the terminal 34, so that it applies the clock pulses φ1 and φ2 to the terminals 24 and 26 of the second HCCD 20 which is located next to the first HCCD 20 in the vertical scanning direction V. In response to the pulses thus applied, similarly as in the first HCCD 20, in the second HCCD 20 the optical charges of the picture elements are transferred in the horizontal direction H and are applied to the amplifier 14 through the output terminal 36 beginning with the leftmost optical charge. Thus, the optical charges are outputted as the picture signal of the second horizontal scanning line through the output terminal 38.

The process is repeated until finally the scanning circuit 16 applies the clock pulses φ1 and φ2 to the lowermost HCCD 20. Thus, all the optical charges produced by the image pickup cells of the image pickup array 12 have been outputted in the form of a raster scanning picture signal through the output terminal 38.

As is apparent from the above description, in the device of the invention, no vertical transferring CCD is used, and the horizontal transferring CCDs are arranged in a plurality of horizontal lines. These horizontal transferring CCDs are successively driven by the scanning circuit 16 adapted to selectively distribute the driving clock pulses φ1 and φ2, so that the raster scanning picture signal is outputted through the output terminal 38 of the device.

Heretofore, in order to positively transfer the optical charge in the vertical direction, one picture element cell is formed by four electrodes in the vertical direction. On the other hand, in the device of the invention, fundamentally the HCCDs 20 are arranged in the vertical direction V in such a manner that one HCCD 20 is provided in each horizontal line, and at least the picture resolution in the vertical direction V is improved. In practice, as the clock lines 24 and 26 are laid by passing them through the gaps between the electrodes 22, there must be an area for laying the clock lines in this manner. However, depending on a method of laying the clock lines, the resolution in the vertical direction can be made about three times as high as that of the conventional device.

In the above-described charge-coupled image pickup device of the invention, the horizontal transferring CCDs 20 function as image pickup cells. However, it is not always necessary to design the device in such a manner. For instance, the device may be designed as follows: In addition to the horizontal transferring CCDs, image pickup cell regions are provided in parallel with the CCDs. In other words, the device is designed in the same manner as the interline transferring type charge-coupled image pickup device, so that the optical charges produced in the image pickup cell regions are transferred to the corresponding horizontal transferring CCDs, and then the horizontal transferring CCDs are selectively driven as was described above. Furthermore, the device may be so designed that, similarly as in the interline transferring type CCD or the frame transferring type CCD, a light receiving section, namely an image pickup cell array is provided in addition to the horizontal transferring CCDs 20, and after the optical charges produced thereby have been transferred to the horizontal transferring CCDs 20, the horizontal transferring CCDs 20 are selectively driven as was described above. If the order of selecting the horizontal transferring paths is modified in this manner, then even the frame transferring type CCD can provide a one-picture two-field sequential signal, which is the same as that in the embodiment of FIG. 1.

Usually, as mentioned above, as the charge is transferred in an extremely short period with respect to the exposure period, the charge formed in the light receiving section 2 during the transfer period is small enough to be disregarded. However if the exposure period is relatively short or there is an extremely bright part 4 such as a sun in the picture, as shown in FIG. 2, that is, the picture has very high in picture contrast, then a false signal 5 is provided in the form of a vertical bright spread in the picture.

FIG. 2 shows the signal charges formed in the CCD 1 being recorded on the floppy disc 6 by a two-channel magnetic recording device 20 in the order of the first field and second field.

A signal processing operation for the signal charges will be described with reference to FIGS. 4 through 9. The operation is accomplished in order to eliminate drawbacks caused by the false signal 5.

Figure 4:
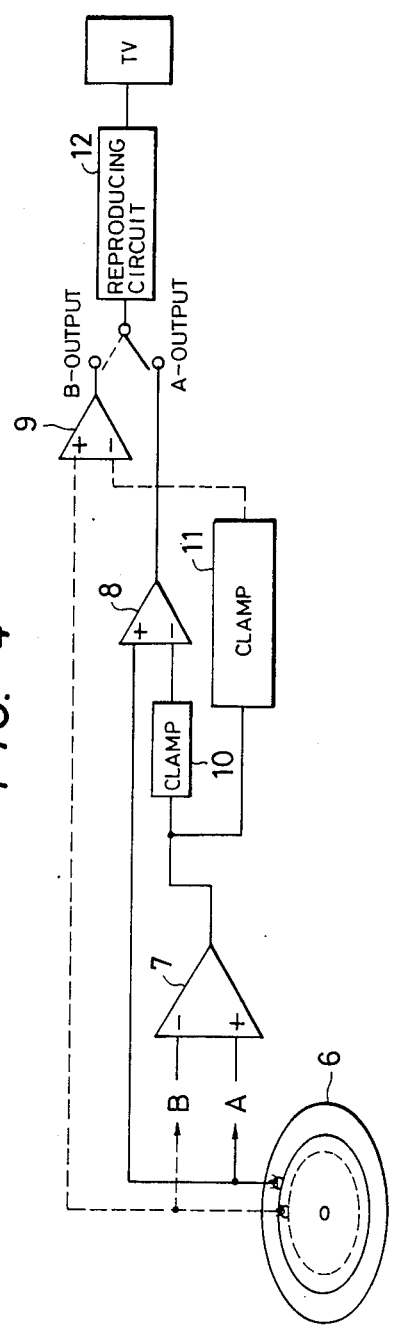
FIG. 4 is a block diagram showing the arrangement of a signal processing circuit according to the present invention.
Figure 5:
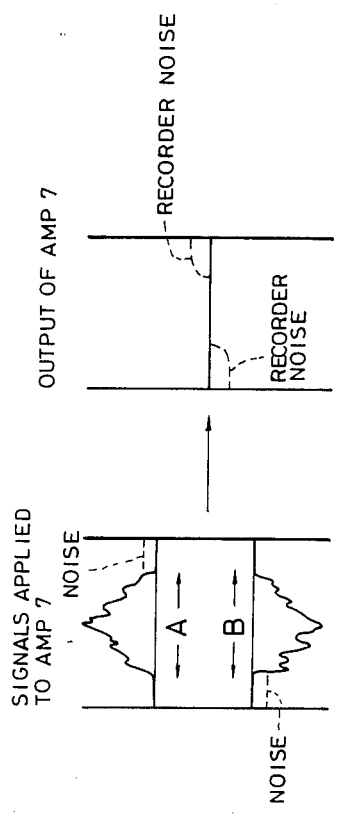
FIG. 5 is a waveform diagram showing the waveforms of signals formed during the signal processing operation.

FIG. 4 shows the first embodiment of the signal processing circuit. The picture signals of the first and second fields A and B are simultaneously read out of the floppy disc 6 by individual magnetic heads and are applied respectively to the non-inversion input terminal and the inversion input terminal of a first differential amplifier 7. The first and inverted second field picture signals A and B are shown in FIG. 5. At the same time, the picture signal of first field A is supplied to the non-inversion input terminal of a second differential amplifier 8, while the picture signal of the second field B is supplied to the non-inversion input terminal of a third differential amplifier 9.

A difference signal outputted by the first differential amplifier 7 is applied to a first clamp circuit 10 and to a second clamp circuit 11, which also inverts. The first clamp circuit 10 forms a positive difference signal component, which is applied to the inversion input terminal of the second differential amplifier 8. On the other hand, the second clamp circuit 11 forms a negative difference signal component, and inverts its polarity. The negative difference signal component whose polarity has been inverted is applied to the inversion input terminal of the third differential amplifier 9. As a result, the second differential amplifier 8 provides a true first field A picture signal at its output terminal, while the third differential amplifier 9 provides a true second field B picture signal at its output terminal.

Figure 6:
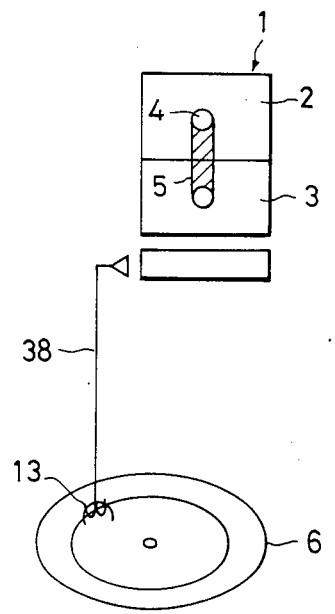
FIGS. 6 to 8 are diagrams for a description of signal processing steps according to the present invention.
Figure 7:
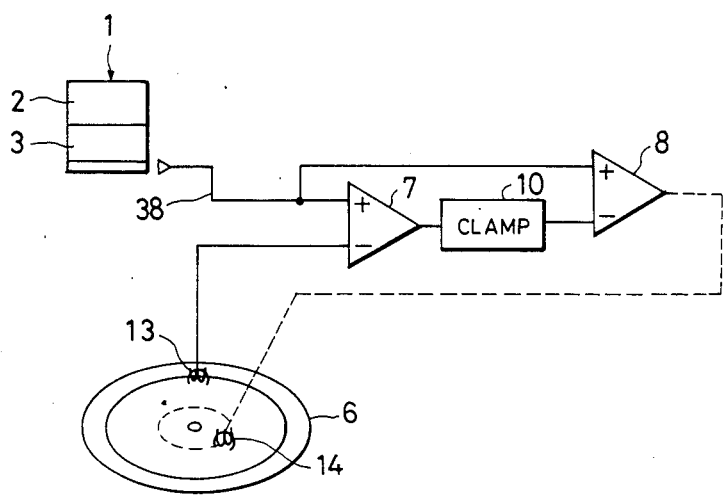
Figure 8:
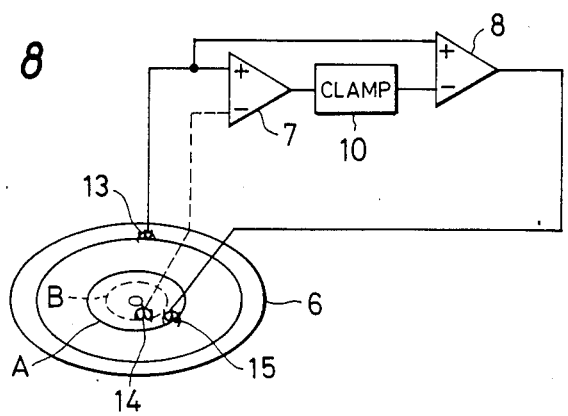
Figure 9:
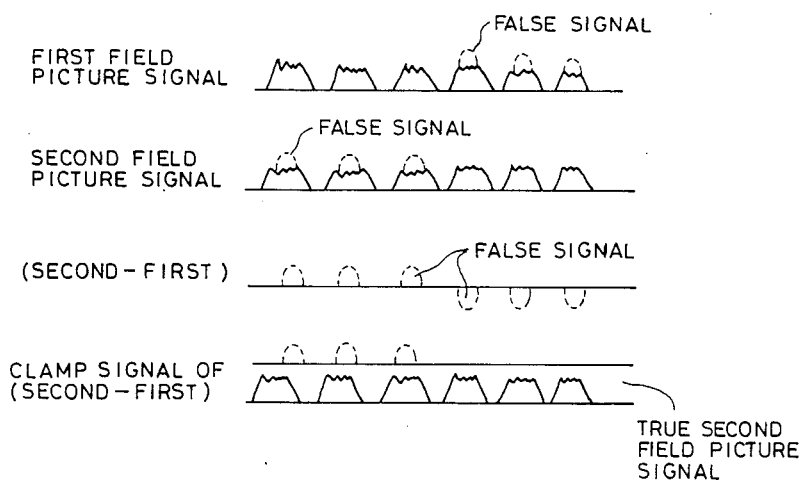
FIG. 9 is a waveform diagram showing signal waveforms which are provided during a signal processing operation according to the invention.

FIG. 6, 7, 8 and 9 show the operating steps of the second embodiment of the signal processing circuit according to the first field present invention. As shown in FIG. 6 and 9, the first field picture signal including a false signal is temporarily recorded on a predetermined track of the floppy disc 6 by a first magnetic head 13. In this operation, in the CCD 1, while the picture signal is transferred out of the charge storing section 3, the second field picture signal is transferred from the light receiving section 2 to the charge storing section 3.

Next, as shown in FIG. 7, the second field picture signal including a false signal is read out of the charge storing section 3 of the CCD 1 and applied to the non-inversion input terminal of a first differential amplifier 7 in a signal processing circuit. At the same time, the aforementioned picture signal of field A is applied from the floppy disc 6 through the first magnetic head 13 to the inversion input terminal of the first differential amplifier 7. The first differential amplifier 7 forms a difference signal B-A between the two signals. The difference signal B-A is applied to a clamp circuit 10, where, of the difference signal B-A corresponding to the false signal, only the positive component is taken out. The positive component is supplied to the inversion input terminal of a second differential amplifier 8. At the same time, the second field picture signal including the false signal which is read out of the charge storing section 3 of the CCD 1 is applied to the non-inversion input terminal of the second differential amplifier 8. The second differential amplifier 8 forms the difference between the second field picture signal and the aforementioned positive component. The difference thus formed is the true second field picture signal. The second field true picture signal is recorded on a predetermined track of the floppy disc 6 by a second magnetic head 14.

Thereafter, as shown in FIG. 8, the temporary first field picture signal and the true second field picture signal are read out of the floppy disc 6 by the first and second magnetic heads 13 and 14, respectively. These picture signals thus read are applied to the non-inversion input terminal and the inversion input terminal of the first differential amplifier 7, respectively. The difference signal between these picture signals corresponds to a part of the false signal which is included in the first field picture signal, i.e., the negative component of the false signal. Accordingly, in this case, it is unnecessary to apply the difference signal to the clamp circuit 9, however, it may be applied through the clamp circuit 9 to the differential amplifier 8 because the signal processing circuit is the same as that which has been described with reference to FIG. 7. It goes without saying that no trouble is caused by applying the difference signal to the clamp circuit 9. The temporary first field picture signal is applied through the magnetic head 13 to the non-inversion input terminal of the second differential amplifier 8, while the difference signal is applied to the inversion input terminal of the second differential amplifier 8. As a result, the second differential amplifier 8 provides a true first field picture signal, which is applied through a third magnetic head 15 to the floppy disc 6.

Thus, the true first field picture signal including no false signal is recorded on the floppy disc 6. The temporary first field picture signal which has been temporarily recorded is erased later. However, it may be erased immediately before the next photographic operation.

As was described above, in the electronic still camera system according to the present invention, in the first half of the exposure period of time the light receiving section of the CCD is charged according to the picture, and the charge of the light receiving section is transferred to the charge storing section, and in the second half of the exposure period of time the light receiving section is charged again according to the picture. Therefore, the signals corresponding to two fields are present in the light receiving section and the storing section of the CCD. By reading these signals, a picture signal for one frame can be obtained without lowering the resolution power.

Further, when the period of charge transfer is much shorter than the period of exposure, the false signal is produced. However, according to the invention, the signal formed by the light receiving section is once recorded on the floppy disc or the like, to eliminate the false signal. Thus, the picture signal which does not adversely affect the picture quality can be recorded.

Figure 10:
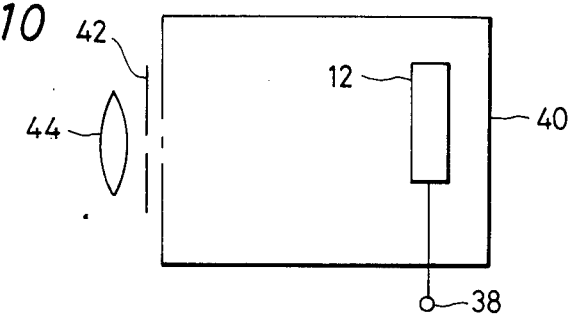
FIG. 10 is a schematic diagram of a camera.

In FIG. 10 is presented a schematic diagram of the electronic still camera. The image pickup cell array 12 is enclosed in a dark box 40 having an aperture facing a shutter 42, controlled by the operator's button after the delay for the false reading, and an optical system 44.

What is claimed is:
1. An electronic camera system, comprising:
a dark box having an aperture;
an image forming optical system facing said aperture;
a shutter facing said aperture;
a light receiving section comprising a CCD disposed inside said box;
means for carrying out a false reading of said CCD;
means for controlling said shutter to expose said CCD for an exposure period subsequent to said false reading;
a charge storing section;

means for transferring charge signals from said light receiving section to said charge storing section during said exposure period in a transferring time much shorter than said exposure period; and means for sequentially reading out charge signals from said light receiving section and said charge storing section subsequent to said exposure period.

2. An electronic camera system as claimed in claim 1, wherein said light receiving section and said charge storing section are constituted by a CCD disposed inside said box.

3. An electronic camera system as claimed in claim 1, wherein said transferring period of time is 1/100 of said exposure period or less.

4. An electronic still camera system as claimed in claim 3 wherein said exposure period is a time in a range of 1/500 to 1 second.

5. An electronic still camera system as claimed in claim 4, wherein said exposure period is a time in a range of 1/200 to 1/10 second.

6. An electronic still camera system as recited in claim 5, wherein said exposure time is a time in a range of 1/125 to 1/15 second.

7. An electronic still camera system as claimed in claim 6 wherein said exposure period approximately is 1/100 second, and said transferring period is approximately 1/10000 second.

8. An electronic camera system as recited in claim 1, further comprising;

a magnetic recording medium, wherein said sequentially reading means includes means for recording on said recording medium said charge signals read from said light receiving section as first picture signals and said charge signals read from said charge storing section as second picture signals;

means for simultaneously reading from said recording medium first and second picture signals;

means for forming a difference signal between said first and second picture signals;

first clamping means receiving said difference signal to form a positive difference signal;

second clamping means receiving said difference signal to form a negative difference signal;

means for subtracting said positive difference signal from one of said first and second picture signals to form a first true field picture signal; and means for adding said negative difference signal to the other of said first and second picture signals to form a second true field picture signal.

9. An electronic camera as recited in claim 8, wherein said second clamping means and said subtracting means comprise adding means receiving an output of an inverting clamp.

10. An electronic camera system comprising:

a dark box having an aperture, an image forming optical system facing said aperture, a shutter facing said aperture and a field transfer type CCD inside said box, in which during exposure a signal charge is transferred from a light receiving section of said CCD to a charge storing section of said CCD to form first and second field picture signals corresponding to one frame, and said picture signals thus formed are recorded by a magnetic recording medium and then reproduced to form a picture, comprising:

a signal processing circuit with first and second input terminals which are connected respectively to a first magnetic head and a second magnetic head of a magnetic recording device, said signal processing circuit comprising:

a first differential amplifier for forming a difference signal between first and second input signals on said first and second input terminals;

a first clamp circuit for utilizing said difference signal to form a positive difference signal component;

a second clamp circuit for utilizing said difference signal to form a negative difference signal component;

an inverter for inverting the polarity of said negative difference signal component;

a second differential amplifier for forming a difference signal between said first input signal and said positive difference signal component; and a third differential amplifier for forming a difference signal between said second input signal and said negative difference signal component which is inverted in polarity, said second and third differential amplifiers outputting a true first field picture signal and a true second field picture signal, respectively.

11. An electronic camera system as claimed in claim 1 wherein said charge-coupled device comprises a plurality of horizontal charge transferring path means having a CCD structure for transferring charges in a horizontal direction in response to clock pulses, said path means being arranged in a vertical direction in the raster scanning operation of picture signals;

a signal output terminal through which pictures signals are outputted;

output circuit means connected to the ends of said plurality of horizontal charge transferring path means as viewed in the charge transferring direction thereof, to apply picture signals corresponding to charges outputted through said ends to said output terminal; and drive means for applying said clock pulses successively to said plurality of horizontal charge transferring path means according to a raster scanning operation;

whereby said raster scanning operation provides picture signals through said output terminal.

12. An electronic camera system as claimed in claim 11, wherein horizontal charge transferring path means produce charges corresponding to incident light with respect to picture elements.

13. An electronic camera system as claimed in claim 11, wherein said clock pulses are two-phase clock pulses which are opposite in phase to each other.

14. A signal processing method for an electronic camera including a dark box with an aperture, an image forming optical system facing said aperture, a shutter facing said aperture and a field transfer type CCD inside said box, in which during exposure a signal charge is transferred from a light receiving section of said CCD to a charge storing section of said CCD to form first and second field picture signals corresponding to one frame, and said picture signals thus formed are recorded on a magnetic recording medium and then reproduced to form a picture, comprising the steps of:

forming a difference signal between said first and second field picture signals, said difference signal being divided into positive and negative difference signal components; and obtaining a difference signal between said first field picture signal and said positive difference signal component and a difference signal between said second field picture signal and said negative difference signal component, said difference signals being used as a true first field picture signal and a true second field picture signal, respectively.

15. A method as claimed in claim 14, in which:

a first field picture signal read out of said CCD is temporarily stored on a magnetic recording medium, when a second field picture signal is read out of said CCD, simultaneously said second field picture signal thus stored is read out, a difference signal between said first and second picture signals thus read is obtained, said difference signal thus obtained is divided into a positive component and a negative component by a clamp circuit, the difference between said second field picture signal and said negative difference signal component is obtained so as to be recorded as a true second field picture signal, the difference between said first field picture signal temporarily stored and said true second field picture signal is obtained as a positive difference signal component, and the difference signal between said positive difference signal component and said first field picture signal is obtained so as to be recorded as a true first field picture signal.

* * * * *